United States Patent
Kudo et al.

(10) Patent No.: US 9,437,218 B2
(45) Date of Patent: Sep. 6, 2016

(54) MAGNETIC RECORDING HEAD AND MAGNETIC RECORDING APPARATUS

(71) Applicant: KABUSHIKI KAISHA TOSHIBA, Tokyo (JP)

(72) Inventors: Kiwamu Kudo, Kanagawa (JP); Hirofumi Suto, Tokyo (JP); Tazumi Nagasawa, Kanagawa (JP); Koichi Mizushima, Kanagawa (JP); Rie Sato, Kanagawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 0 days.

(21) Appl. No.: 14/796,462

(22) Filed: Jul. 10, 2015

(65) Prior Publication Data

US 2016/0027455 A1    Jan. 28, 2016

(30) Foreign Application Priority Data

Jul. 25, 2014   (JP) .................................. 2014-151910

(51) Int. Cl.
  *G11B 5/00*    (2006.01)
  *G11B 5/39*    (2006.01)

(52) U.S. Cl.
  CPC ......... *G11B 5/00* (2013.01); *G11B 2005/0002* (2013.01); *G11B 2005/0021* (2013.01); *G11B 2005/0024* (2013.01); *G11B 2005/3996* (2013.01)

(58) Field of Classification Search
  None
  See application file for complete search history.

(56) References Cited

U.S. PATENT DOCUMENTS

| 6,011,664 A | 1/2000 | Kryder et al. |
| 7,616,412 B2 * | 11/2009 | Zhu ........................ B82Y 10/00 360/324.2 |
| 8,203,389 B1 * | 6/2012 | Zhou ................... H03B 15/006 331/3 |
| 2006/0222835 A1 | 10/2006 | Kudo et al. |
| 2008/0019040 A1 | 1/2008 | Zhu et al. |
| 2010/0110592 A1 | 5/2010 | Koui et al. |

(Continued)

FOREIGN PATENT DOCUMENTS

| JP | 2006-286855 | 10/2006 |
| JP | 4050245 | 2/2008 |

(Continued)

OTHER PUBLICATIONS

First Office Action mailed by the Japanese Patent Office on Nov. 4, 2015, in counterpart Japanese Patent Application No. 2014-151910.

(Continued)

*Primary Examiner* — Carlos E Garcia
(74) *Attorney, Agent, or Firm* — Finnegan, Henderson, Farabow, Garrett & Dunner, LLP

(57) ABSTRACT

According to an embodiment, a magnetic recording head includes a main magnetic pole and a spin torque oscillator. The spin torque oscillator includes a first perpendicular free layer, a second perpendicular free layer, and a first spacer layer, each of the first perpendicular free layer and the second perpendicular free layer including a magnetic anisotropy axis in a direction perpendicular to a film plane of the spin torque oscillator. An effective perpendicular magnetic anisotropy magnetic field of the first perpendicular free layer is smaller than an effective perpendicular magnetic anisotropy magnetic field of the second perpendicular free layer, and a current is applied from the first perpendicular free layer side to the second perpendicular free layer side.

8 Claims, 9 Drawing Sheets

(56) References Cited

U.S. PATENT DOCUMENTS

| | | | |
|---|---|---|---|
| 2011/0080221 A1 | 4/2011 | Lee et al. | |
| 2012/0126905 A1* | 5/2012 | Zhang | G11B 5/3146 331/94.1 |
| 2012/0243127 A1* | 9/2012 | Iwasaki | G01R 33/093 360/93 |
| 2013/0063840 A1 | 3/2013 | Koui et al. | |
| 2013/0070367 A1 | 3/2013 | Igarashi et al. | |
| 2013/0286505 A1 | 10/2013 | Fukuda et al. | |

FOREIGN PATENT DOCUMENTS

| | | |
|---|---|---|
| JP | 2010-113764 | 5/2010 |
| JP | 2011-082499 | 4/2011 |
| JP | 2012-203916 | 10/2012 |
| JP | 5172004 B1 | 1/2013 |
| JP | 2013-58295 | 3/2013 |
| JP | 2013-229084 | 11/2013 |
| WO | WO 2010/053187 A1 | 5/2010 |
| WO | WO 2011/030449 A1 | 3/2011 |

OTHER PUBLICATIONS

Notification of Reasons for Refusal mailed by the Japanese Patent Office on Jun. 28, 2016, in counterpart Japanese Patent Application No. 2014-151910.

* cited by examiner

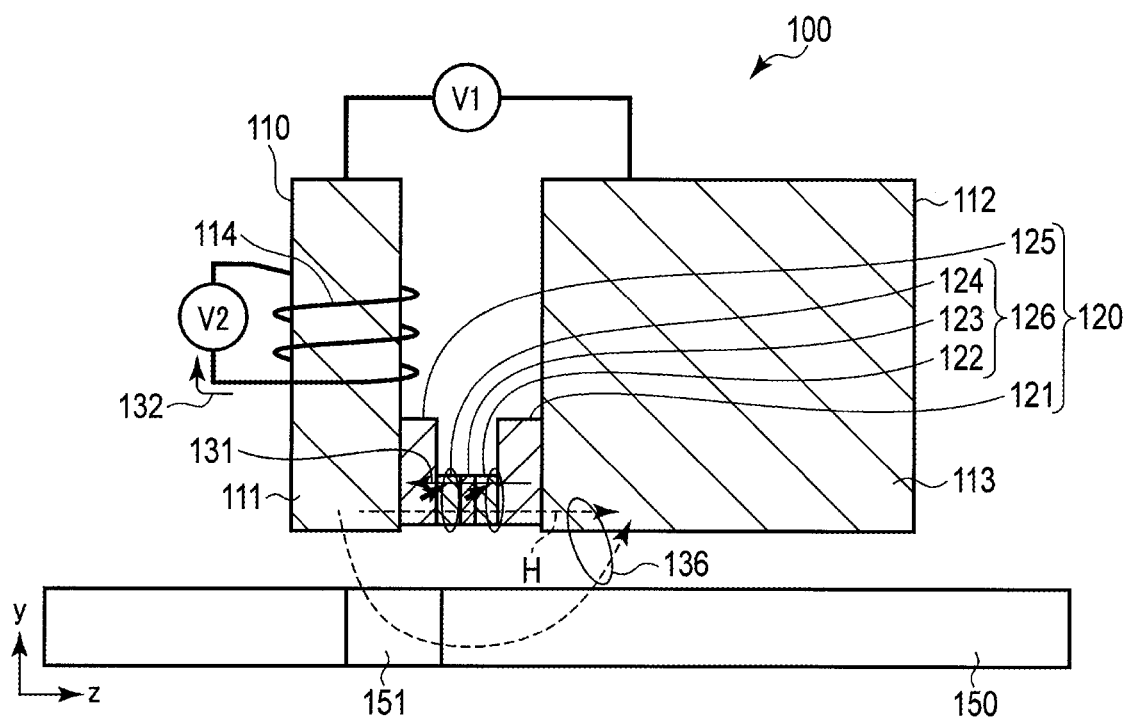
F I G. 1
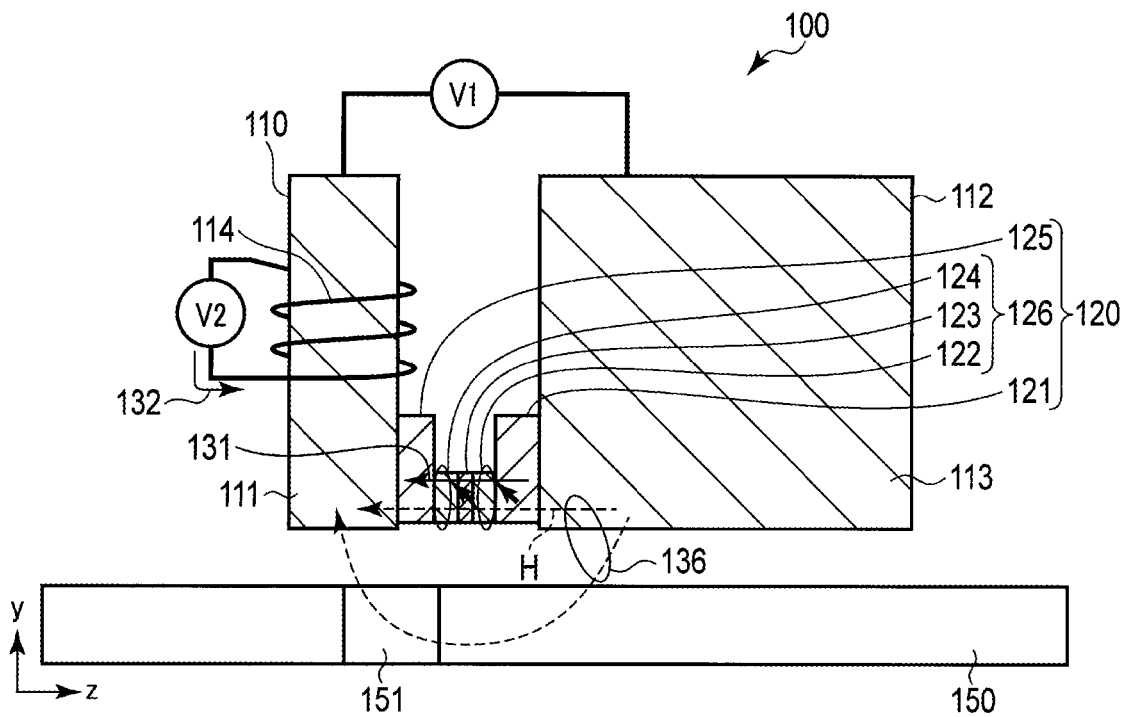
F I G. 2

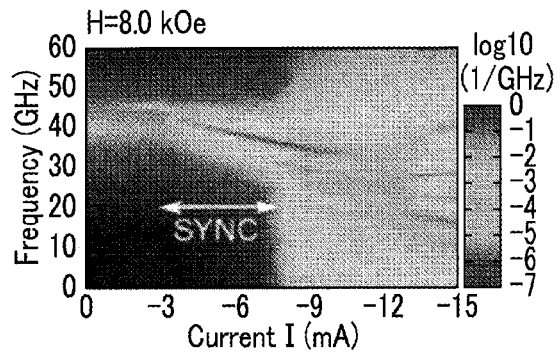
F I G. 4A
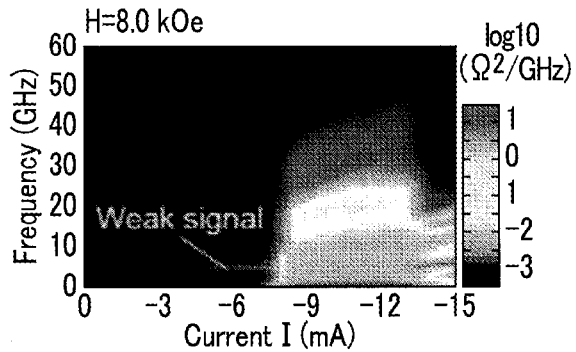
F I G. 4B
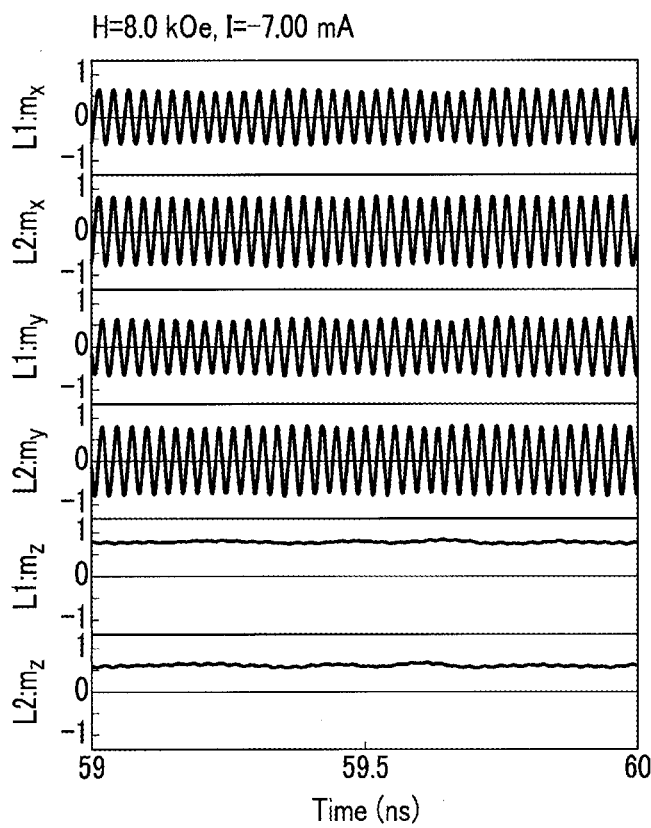
F I G. 4C
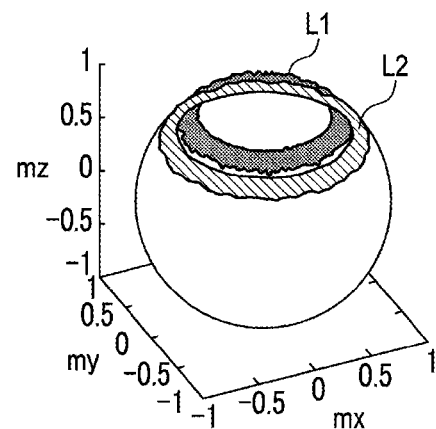
F I G. 4D

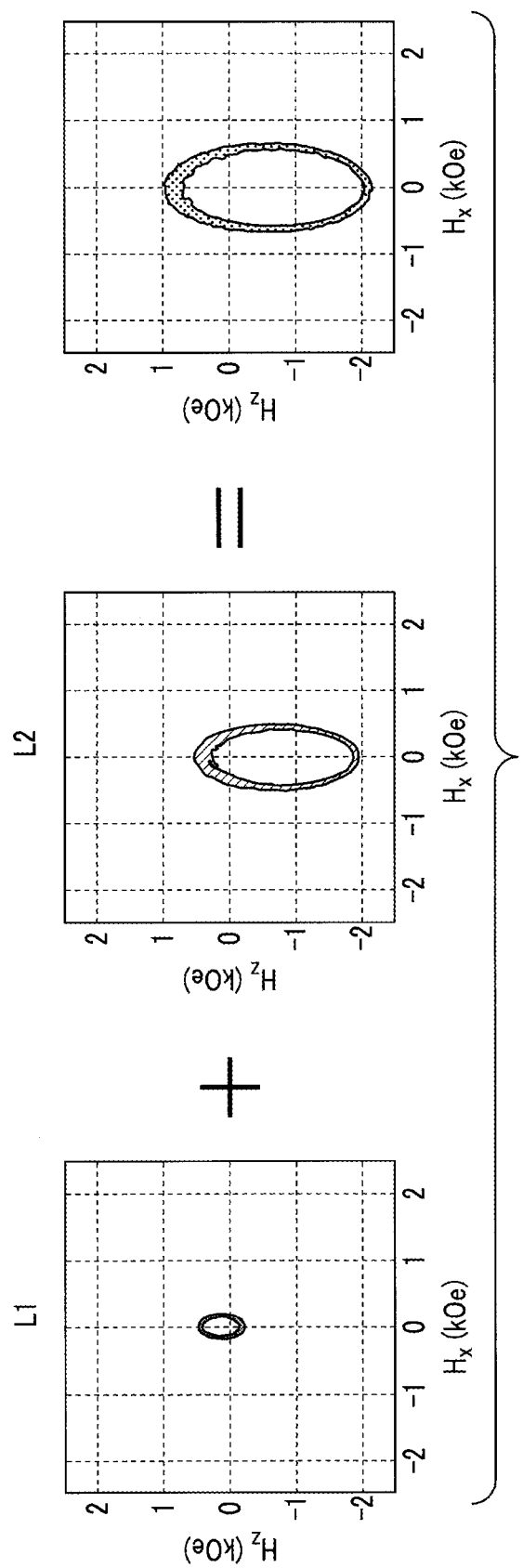
F I G. 6

MAGNETIC RECORDING HEAD AND MAGNETIC RECORDING APPARATUS

CROSS-REFERENCE TO RELATED APPLICATIONS

This application is based upon and claims the benefit of priority from Japanese Patent Application No. 2014-151910, filed Jul. 25, 2014, the entire contents of which are incorporated herein by reference.

FIELD

Embodiments described herein relate generally to a magnetic recording head and a magnetic recording apparatus using the same.

BACKGROUND

The recording density of a Hard Disk Drive (HDD) is about 1 Tbit/inch$^2$ as of 2014. The recording density increases every year, and the rate of increase until several years ago is about 40% annually, and in recent years, the rate of increase continues at about a 15% annual rate. An increase in recording density is realized by micronizing the size of magnetic particles. When the size of the magnetic particles becomes smaller, magnetization of the magnetic particles becomes thermally unstable, and it becomes impossible to retain recorded information for a long period of time. In order to prevent such a problem from being caused, it is necessary to enhance the magnetic field intensity needed to reverse the magnetization of the magnetic particles, i.e., it becomes necessary to use a magnetically hard magnetic material. However, when magnetic particles which are extremely magnetically hard are used, it becomes difficult to rewrite recorded information. In order to increase the recording density, it is necessary to simultaneously overcome three mutually contradictory technical walls, i.e., micronization of magnetic particles, use of thermally stable magnetic particles for long-term retention of information, and easy rewriting of recorded information. The three walls are called the trilemma of HDD recording density improvement.

As a magnetic recording technique aiming at a breakthrough in the trilemma of HDD recording density improvement from the viewpoint of easy rewriting of recorded information, the high-frequency wave assisted magnetic recording (also called the microwave assisted magnetic recording (MAMR)) is known. The high-frequency wave assisted magnetic recording is a technique for facilitating writing of information by locally applying a high frequency magnetic field having a frequency near the resonance frequency of a magnetic recording medium to the magnetic recording medium to thereby resonate the magnetic recording medium, and temporarily lower the coercive force thereof (see, for example, U.S. Pat. No. 6,011,664). The point of this technique is to efficiently superimpose as large a high frequency magnetic field as possible upon the recording magnetic field.

As a method of efficiently generating a high frequency magnetic field, a method utilizing a magnetization oscillation element based on spin torque is disclosed (see, for example, JP-B 4050245 and US2008/0019040). The magnetization oscillation element based on spin torque has generally been called a spin-torque oscillator (STO) since about 2006. The STO can generate a high frequency magnetic field resulting from magnetization oscillation near the element by passing a DC current, and hence expectations are placed on the STO as an efficient high-frequency magnetic field generation source in the MAMR.

Regarding the MAMR using the STO, engineers concerned with the technique thereof are carrying out design/research and development while paying attention mainly to the following four points: (1) A rotational direction of a microwave magnetic field effective for the MAMR exists (an effective microwave magnetic field component has a rotational direction identical to the direction of the precession movement of recording medium magnetization), and thus designs that take the direction into consideration are desired. (2) It is desirable that a direction of an STO drive current be a fixed direction irrespective of a direction of a magnetic field from the main magnetic pole. (3) It is desirable that designing be carried out in such a manner that a distance between the main magnetic pole and write point is as short as possible in order to make the magnetic field from the main magnetic pole as strong as possible. (4) It is desirable to cause magnetization oscillation in the STO so that the microwave magnetic field intensity becomes as strong as possible.

As a high frequency assisted magnetic recording head which generates a microwave magnetic field effective for the MAMR of point (1) above, and in which the STO drive current has a fixed direction of (2), an assisted head provided with an STO of a "perpendicular free layer+in-plane free layer" type is disclosed in JP-B 5172004. In JP-B 5172004, a high-frequency wave assisted head in which an STO of a "perpendicular free layer+in-plane free layer" type is provided between the main magnetic pole and counter magnetic pole in such a manner that the constituent elements are arranged in the order of the main magnetic pole, perpendicular free layer, in-plane free layer, and counter magnetic pole (FIG. 15A of JP-B 5172004), is described as a configuration of a desirable high frequency wave assisted head. In JP-B 5172004, it is stated that it becomes possible, by using this assisted head, to realize an information transfer rate exceeding 2 Gbit/s in magnetic recording to which microwave assisted recording realizing a recording density exceeding 1 Tbit/inch$^2$ is applied.

However, the assisted head disclosed in JP-B 5172004 has disadvantageous points with respect to the aforementioned points to note (3) and (4). Regarding point (3), there is a problem that a perpendicular free layer (of which a description stating that the perpendicular free layer hardly contributes to the high frequency wave assisted magnetic field is given) is provided between a main magnetic pole and in-plane free layer, and thus a distance between the main magnetic pole and write point becomes longer by a length corresponding to at least a film thickness of the perpendicular free layer, and the design freedom relating to the distance between the main magnetic pole and write point is limited. Regarding point (4), two types of free layer magnetization of the perpendicular free layer and the in-plane free layer rotate with a phase difference of 180° held between them, so there is a problem that high-frequency magnetic fields resulting from these two types of free layer magnetization cancel each other out. The degree of the cancellation becomes more conspicuous with an increase in the distance between the high frequency magnetic field application point in the magnetic recording medium and STO. Incidentally, a technique of applying a high frequency wave assisted recording head using an STO to three-dimensional magnetic recording (see, for example, WO2011/030449) is disclosed. In the case of the three-dimensional magnetic recording, the distance between the high frequency magnetic field application point and STO becomes longer in a thickness direction of the medium. Accordingly, the STO in which two types of magnetization rotate with a phase difference of 180° held between them is disadvantageous to the application of the three-dimensional magnetic recording because the high frequency magnetic fields cancel each other out.

BRIEF DESCRIPTION OF THE DRAWINGS

FIG. 1 and FIG. 2 are cross-sectional views showing a magnetic recording head according to a first embodiment.

FIG. 4A, FIG. 4B, FIG. 4C, and FIG. 4D are views showing results of a simulation in the case of H=+8 kOe.

FIG. 6 is a view showing high frequency magnetic fields occurring concomitantly with oscillation of L1 magnetization and L2 magnetization.

DETAILED DESCRIPTION

Figure 3:
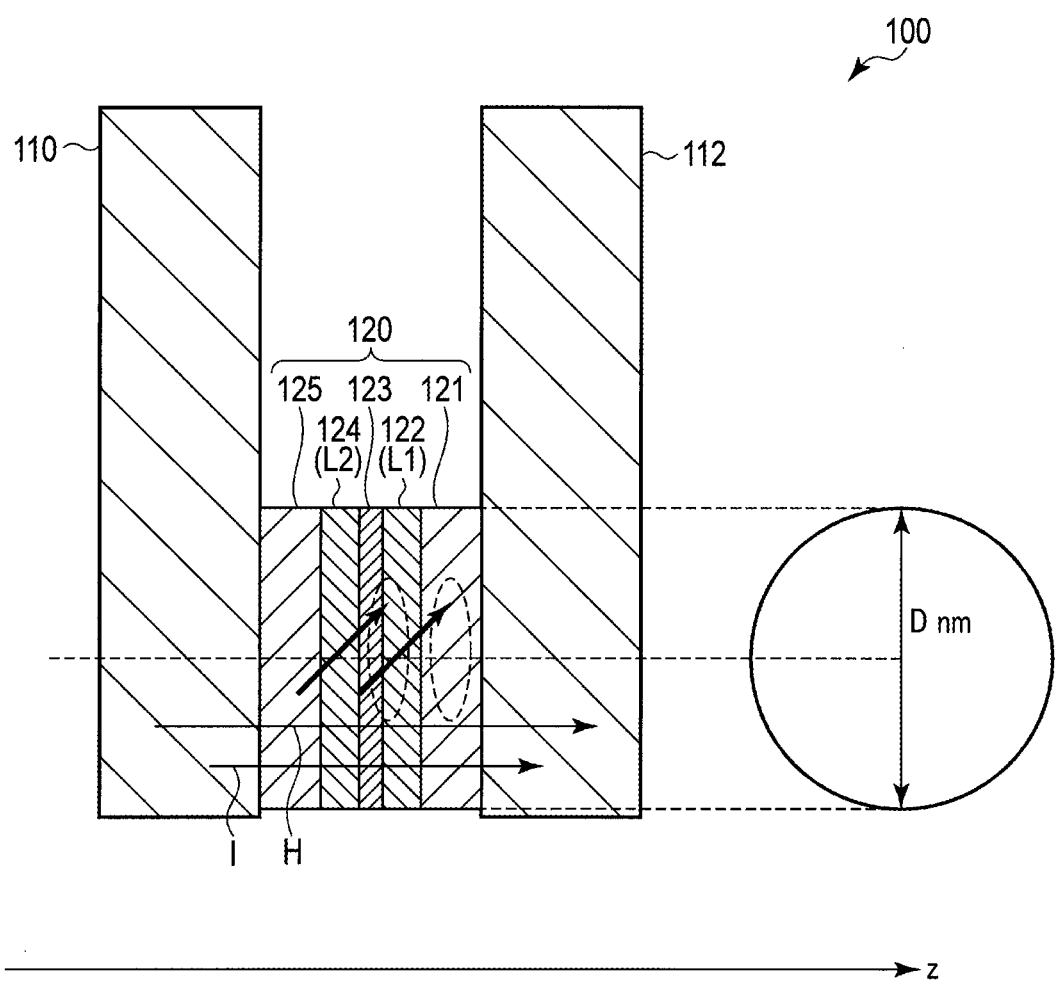
FIG. 3 is a cross-sectional view showing the design of a magnetic recording head used for simulation relating to the dynamics of perpendicular free layer magnetization.

According to an embodiment, a magnetic recording head includes a main magnetic pole and a spin torque oscillator. The main magnetic pole generates a recording magnetic field. The spin torque oscillator generates a high frequency magnetic field, the spin torque oscillator comprising a pair of electrode layers and a multilayer film provided between the pair of electrode layers, the multilayer film comprising a first perpendicular free layer in which magnetization is rotatable, a second perpendicular free layer in which magnetization is rotatable, and a first spacer layer provided between the first perpendicular free layer and the second perpendicular free layer, each of the first perpendicular free layer and the second perpendicular free layer including a magnetic anisotropy axis in a direction perpendicular to a film plane of the spin torque oscillator. An effective perpendicular magnetic anisotropy magnetic field of the first perpendicular free layer is smaller than an effective perpendicular magnetic anisotropy magnetic field of the second perpendicular free layer, and a current is applied from the first perpendicular free layer side to the second perpendicular free layer side through the pair of electrode layers.

Hereinafter, embodiments will be described with reference to the drawings. In the following embodiments, like reference numbers denote like elements, and duplicated descriptions are appropriately omitted.

First Embodiment

FIG. 1 schematically shows a magnetic recording head 100 according to a first embodiment. As shown in FIG. 1, the magnetic recording head 100 includes a main magnetic pole 110, an auxiliary magnetic pole 112 which forms a magnetic circuit together with the main magnetic pole 110, an exciting coil 114 winding around the main magnetic pole 110, and a spin torque oscillator 120 provided between a distal end part 111 of the main magnetic pole 110 and distal end part 113 of the auxiliary magnetic pole 112. The distal end part 111 and the distal end part 113 are parts positioned on the magnetic recording medium 150 side in the arrangement at the time at which the magnetic recording head 100 records information on the magnetic recording medium 150. The magnetic recording head 100 further includes a power supply V1 which supplies a current 131 to the spin torque oscillator 120, and a power supply V2 which supplies a current 132 to the exciting coil 114.

The main magnetic pole 110 generates a recording magnetic field 136 used to record information on the magnetic recording medium 150. When the current 132 is supplied to the exciting coil 114 from the power supply V2, the recording magnetic field 136 is generated. The recording magnetic field 136 is controlled by turning on/off of the power supply V2, and by changing polarity. When the current 132 flows in the direction of the arrow shown in FIG. 1, the recording magnetic field 136 flows out of the main magnetic pole 110, and flows into the auxiliary magnetic pole 112 as indicated by the dotted line arrow. The recording magnetic field 136 in the direction shown in FIG. 1 is used to reverse the magnetization of a target bit 151 in the magnetic recording medium 150 from up to down. On the other hand, when the current 132 flows in the direction of an arrow shown in FIG. 2 (that is, in a direction opposite to the direction of the arrow shown in FIG. 1), the recording magnetic field 136 flows out of the auxiliary magnetic pole 112, and flows into the main magnetic pole 110 as indicated by the dotted line arrow. The recording magnetic field 136 in the direction shown in FIG. 2 is used to reverse the magnetization of the target bit 151 from down to up. As shown in FIG. 1 and FIG. 2, the recording magnetic field 136 acts on the spin torque oscillator 120 in a direction perpendicular to the film plane of the spin torque oscillator 120. In FIG. 1 and FIG. 2, a magnetic field component acting on the spin torque oscillator 120 is shown as H.

It should be noted that although the magnetic recording medium 150 is a perpendicular magnetic recording medium in this embodiment, the magnetic recording medium 150 may be an in-plane magnetic recording medium.

The spin torque oscillator 120 generates a high frequency magnetic field in order to assist a magnetization reversal to be carried out by the recording magnetic field 136. The high frequency magnetic field is also called a microwave magnetic field or the like. The spin torque oscillator 120 causes the target bit 151 to magnetically resonate by locally applying the high frequency magnetic field to the magnetic recording medium 150, whereby a state where the magnetization of the target bit 151 can easily be reversed is obtained. In this state, when the recording magnetic field 136 acts on the target bit 151, the magnetization of the target bit 151 is reversed. That is, by simultaneously applying the recording magnetic field 136 and the high frequency magnetic field to the magnetic recording medium 150, it is possible to selectively reverse the magnetization of the target bit 151. Here, the term "simultaneously applying" implies that the period for which the recording magnetic field 136 is applied and the period for which the high frequency magnetic field is applied at least partially overlap each other. In this way, the reversal of medium magnetization to be carried out by the recording magnetic field 136 is assisted by the high frequency magnetic field from the spin torque oscillator 120.

The spin torque oscillator 120 includes a magnetic multilayer film 126, and a pair of electrode layers 121 and 125 provided to apply the current 131 to the magnetic multilayer film 126. The magnetic multilayer film 126 includes a perpendicular free layer (first perpendicular free layer) 122 which includes a magnetic anisotropy axis in a direction perpendicular to the film plane, and in which magnetization can rotate, a spacer layer 123, and a perpendicular free layer (second perpendicular free layer) 124 which includes a magnetic anisotropy axis in the direction perpendicular to the film plane and in which magnetization can rotate.

The electrode layer 121, perpendicular free layer 122, spacer layer 123, perpendicular free layer 124, and electrode layer 125 are arranged from right-to-left in parallel with each other in the order mentioned as illustrated in FIG. 1. The perpendicular free layer 122 is stacked on the electrode layer 121, the spacer layer 123 is stacked on the perpendicular free layer 122, the perpendicular free layer 124 is stacked on the spacer layer 123, and the electrode layer 125 is stacked on the perpendicular free layer 124. The film plane is a plane perpendicular to the stacking direction in which these layers 121 to 125 are stacked. The electrode layer 121 is provided between the auxiliary magnetic pole 112 and perpendicular free layer 122, and the electrode layer 125 is provided between the perpendicular free layer 124 and main magnetic pole 110.

An effective perpendicular magnetic anisotropy magnetic field of the perpendicular free layer 122 is smaller than an effective perpendicular magnetic anisotropy magnetic field of the perpendicular free layer 124. Here, the effective perpendicular magnetic anisotropy magnetic field is a magnetic field $H_u^{eff}$ expressed by the following formula (1).

$$H_u^{eff} = \frac{2K_u}{M_s} - 4\pi M_s N_z \quad (1)$$

In the formula (1), $K_u$ denotes perpendicular magnetic anisotropy, $M_s$ denotes saturated magnetization, and $N_z$ denotes a demagnetization coefficient in a direction perpendicular to the film plane.

In FIG. 1 and some other views, a y-axis and z-axis perpendicular to each other are given for the sake of explanation. The y-axis is an axis perpendicular to a recording layer of the magnetic recording medium 150, and the z-axis is an axis parallel to the stacking direction of the spin torque oscillator 120. A direction extending from the magnetic recording medium 150 toward the magnetic recording head 100 along the y-axis is referred to as the +y direction, and a direction opposite to this direction is referred to as the −y direction. A direction extending from the perpendicular free layer 124 toward the perpendicular free layer 122 along the z-axis is referred to as the +z direction, and a direction opposite to this direction is referred to as the −z direction.

In the spin torque oscillator 120, the current 131 flows from the perpendicular free layer 122 side to the perpendicular free layer 124 side (in the −z direction). The current 131 is controlled by the power supply V1. By the mutual spin torque effect between the perpendicular free layer 122 and perpendicular free layer 124 resulting from the current 131, the magnetization of the perpendicular free layer 122 and the magnetization of the perpendicular free layer 124 rotate. In the present embodiment of the case where the current 131 is made to flow through the spin torque oscillator 120 from the perpendicular free layer 122 side to the perpendicular free layer 124 side, in which the effective perpendicular magnetic anisotropy magnetic field of the perpendicular free layer 122 is smaller than the effective perpendicular magnetic anisotropy magnetic field of the perpendicular free layer 124, the magnetization of the perpendicular free layer 122 and the magnetization of the perpendicular free layer 124 rotate approximately in phase with each other.

In the vicinity of the perpendicular free layer 122, a high frequency magnetic field (stray field) occurs due to the rotation of the magnetization of the perpendicular free layer 122. Furthermore, in the vicinity of the perpendicular free layer 124, a high frequency magnetic field (stray field) occurs due to the rotation of the magnetization of the perpendicular free layer 124. When the magnetization of the perpendicular free layer 122 and the magnetization of the perpendicular free layer 124 rotate approximately in phase with each other, an elliptically deflected rotating magnetic field, formed of the high frequency magnetic field from the perpendicular free layer 122 and the high frequency magnetic field from the perpendicular free layer 124, both of which overlap each other to thereby enhance each other, acts on the target bit 151. In the case of FIG. 1, a rotating magnetic field in the direction of a right-handed screw relative to the vertically upward direction from the medium (+y direction) acts on the target bit 151. In the case of FIG. 2, a rotating magnetic field in the direction of a right-handed screw relative to the vertically downward direction from the medium (−y direction) acts on the target bit 151. The rotational direction of each magnetic field is a direction identical to the direction of the precession movement of the magnetization of the target bit 151, and thus a high frequency magnetic field effective for the MAMR acts on the target bit 151.

In the magnetic recording head 100 of the present embodiment, by appropriately adjusting the film thickness of the electrode layer 125 and the film thickness of the spacer layer 123, it is possible to adjust the distance between the main magnetic pole 110 and the target bit 151, and the distance between the high frequency magnetic field generator (perpendicular free layers 122 and 124) of the spin torque oscillator 120 and target bit 151.

A perpendicular free layer corresponding to each of the perpendicular free layers 122 and 124 can be formed by using a perpendicular anisotropic material such as a CoCr system material, L10 metal, $Co_3Pt$, and SmCo. Examples of the CoCr system material include CoCr, CoCrTa, CoCrPt, CoCrPtTa, CoCrPtB, and the like. Examples of the L10 metal include L10-FePt, L10-CoPt, and the like. Alternatively, the perpendicular free layer can also be formed by using a multilayer film system such as a Co/Pd multilayer film, Co/Ni multilayer film, Co/Pt multilayer film, and the like. Furthermore, the perpendicular free layer can also be formed by utilizing a CoFe/MgO interface, CoFeB/MgO interface, FeB/MgO interface, and the like in such a manner that interface magnetic anisotropy is utilized to make the magnetization of the perpendicular free layer substantially perpendicular magnetization. The perpendicular free layer can also be utilized in combination with the above-mentioned structures. Specifically, the perpendicular free layer can include at least one of the CoCr system material, Co/Pd multilayer film, Co/Ni multilayer film, Co/Pt multilayer film, L10 alloy, $Co_3Pt$, SmCo, CoFe/MgO interface, CoFeB/MgO interface, and FeB/MgO interface.

At the time of material selection, it is necessary to take the film thickness of the layer into consideration in order to adjust the magnitude of innate perpendicular magnetic anisotropy Ku of the material, magnitude of saturated magnetization Ms, and demagnetization coefficient Nz in such a manner so that the condition that the effective perpendicular magnetic anisotropy magnetic field of the perpendicular free layer 122 is smaller than the effective perpendicular magnetic anisotropy magnetic field of the perpendicular free layer 124 can be satisfied.

Next, a description will be given of the fact that the magnetization of the perpendicular free layer 122 and the magnetization of the perpendicular free layer 124 rotate approximately in phase with each other. The inventors have carried out a simulation as to the dynamics of magnetization of the perpendicular free layer 122 and magnetization of the perpendicular free layer 124 on the basis of the Landau-Lifshitz-Gilbert-Slonczewski (LLGS) equation into which mutual spin torque and dipole interaction are introduced. FIG. 3 schematically shows the setting of the simulation. As shown in FIG. 3, it is assumed that the spin torque oscillator 120 used in the simulation has a cylindrical shape with a diameter D of 50 nm. The positive direction of the current I is assumed to be the +z direction. The positive direction of the magnetic field H acting on the spin torque oscillator 120 is assumed to be the +z direction. Here, the perpendicular free layers 122 and 124 are labeled as L1 and L2, respectively, magnetization of the perpendicular free layer 122 is referred to as L1 magnetization, and magnetization of the perpendicular free layer 124 is referred to as L2 magnetization.

Parameter settings of the simulation will be described below. Regarding the perpendicular free layer L1, parameter settings have been made as follows; saturated magnetization Ms is 0.7 kemu/cm$^3$, film thickness is 6 nm, perpendicular magnetic anisotropy Ku is 4.0 Merg/cm$^3$, and Gilbert attenuation coefficient α is 0.03. Regarding the perpendicular free layer L2, parameter settings have been made as follows; saturated magnetization Ms is 0.7 kemu/cm$^3$, film thickness is 6 nm, perpendicular magnetic anisotropy Ku is 4.6 Merg/cm$^3$, and Gilbert attenuation coefficient α is 0.03. Also, the film thickness of the spacer layer 123 has been set to 4 nm. Furthermore, the resistance value of the spin torque oscillator 120 of the case where the L1 magnetization and the L2 magnetization are arranged in parallel with each other has been set to 50Ω. The magnetoresistance effect ratio of the spin torque oscillator 120 serving as a magnetoresistance effect film has been set to 20%.

In the above parameter settings, the effective perpendicular magnetic anisotropy magnetic field $H_u^{\textit{eff}}$ of the perpendicular free layer L1 becomes approximately 4.66 kOe, and the effective perpendicular magnetic anisotropy magnetic field $H_u^{\textit{eff}}$ of the perpendicular free layer L2 becomes approximately 6.37 kOe. That is, the effective perpendicular magnetic anisotropy magnetic field of the perpendicular free layer L1 is smaller than the effective perpendicular magnetic anisotropy magnetic field of the perpendicular free layer L2. Here, in the evaluation of the effective perpendicular magnetic anisotropy magnetic field $H_u^{\textit{eff}}$, a value Nz~0.76961 of the demagnetization coefficient in which a discoid shape having a diameter D of 50 nm and film thickness of 6 nm is taken into consideration has been used.

Figure 5A:
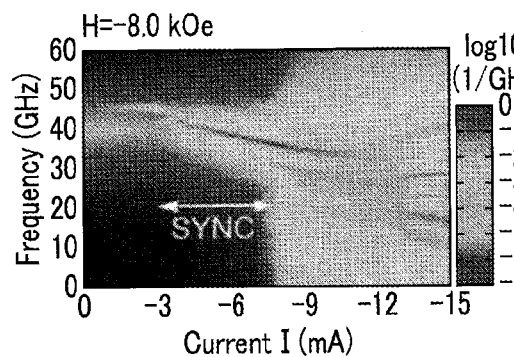
FIG. 5A, FIG. 5B, FIG. 5C, and FIG. 5D are views showing results of a simulation in the case of H=−8 kOe.
Figure 5B:
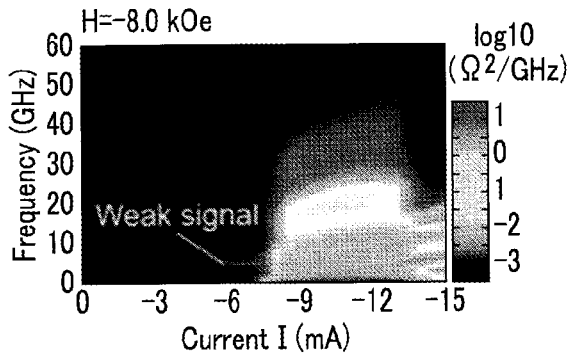
Figure 5C:
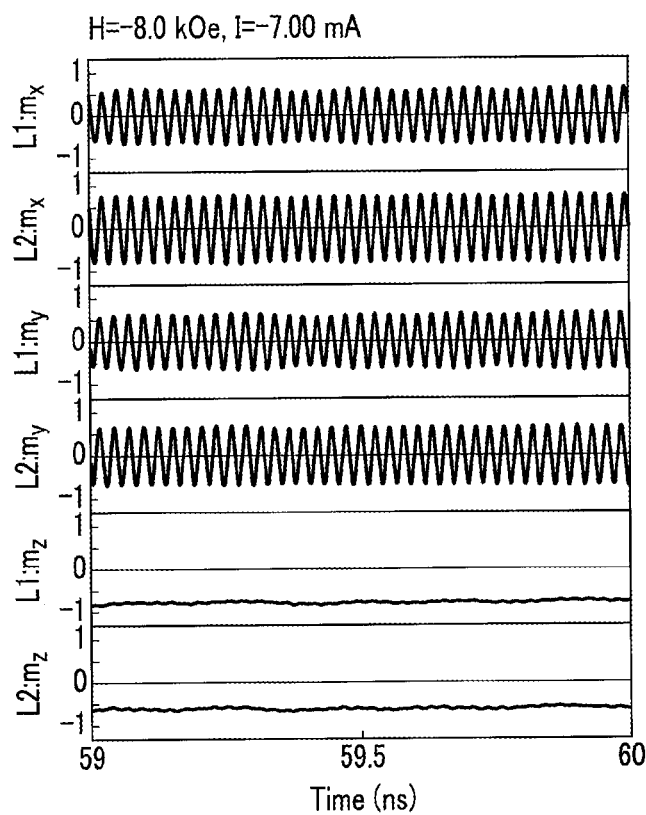
Figure 5D:
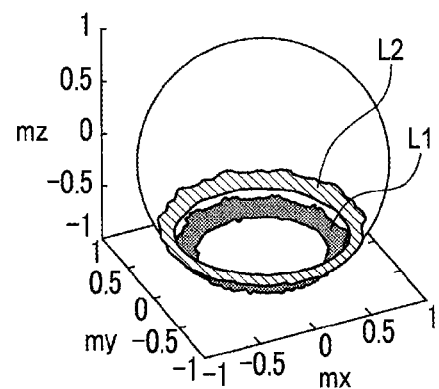

FIGS. 4A to 4D show the dynamics of the L1 magnetization and L2 magnetization of the case where the magnetic field H from the main magnetic pole 110 acting on the spin torque oscillator 120 is +8 kOe (H=+8 kOe). Specifically, FIG. 4A shows the power spectral density (PSD) of a y component of the L1 magnetization, FIG. 4B shows the power spectral density of the resistance change of the spin torque oscillator 120, FIG. 4C shows part of time-series data of the L1 magnetization and L2 magnetization of the case where I is −7.0 mA (I=−7.0 mA), and FIG. 4D shows the orbits of the L1 magnetization and L2 magnetization of the case where I is −7.0 mA (I=−7.0 mA). FIGS. 5A to 5D show the dynamics of the L1 magnetization and L2 magnetization of the case where the magnetic field H from the main magnetic pole 110 acting on the spin torque oscillator 120 is −8 kOe (H=−8 kOe). Specifically, FIG. 5A shows the power spectral density of the y component of the L1 magnetization, FIG. 5B shows the power spectral density of the resistance change of the spin torque oscillator 120, FIG. 5C shows part of time-series data of the L1 magnetization and L2 magnetization of the case where I is −7.0 mA (I=−7.0 mA), and FIG. 5D shows the orbits of the L1 magnetization and L2 magnetization of the case where I is −7.0 mA (I=−7.0 mA). The power spectral density has been calculated by acquiring time-series data of magnetization during a 60 ns period, and by subjecting steady oscillation motion data of the magnetization corresponding to a 50 ns period out of the above 60 ns period to a Fourier transformation. The current has been made to flow from the perpendicular free layer L1 side to the perpendicular free layer L2 side (I<0).

As shown in FIGS. 4A to 4D, and FIGS. 5A to 5D, in the range from −3 to −8 mA of the current I, the L1 magnetization and the L2 magnetization oscillate approximately in phase with each other, i.e., exhibit synchronization (SYNC), and rotate in a right spiral direction with respect to the direction of the magnetic field H. When FIG. 4B and FIG. 5B are referred to, the power spectral density of the resistance change of the spin torque oscillator 120 is very small in that state while reflecting the fact that the oscillation of the L1 magnetization and L2 magnetization are in SYNC. It should be noted that when the current is a positive current (I>0), i.e., when the current is made to flow from the perpendicular free layer L2 side to the perpendicular free layer L1 side, the synchronization of the L1 magnetization and L2 magnetization does not occur, and both the L1 magnetization and the L2 magnetization exhibit chaotic oscillations.

FIG. 6 shows a high frequency magnetic field occurring concomitantly with the oscillations of the L1 magnetization and L2 magnetization of the case where H is +8 kOe (H=+8 kOe), and I is −7.0 mA (I=−7.0 mA). The high frequency magnetic field of FIG. 6 is a magnetic field at a point 2 nm away from the boundary between the spacer layer 123, and perpendicular free layer L2 in the −y direction. As shown in FIG. 6, an elliptically deflected rotating magnetic field appears that is formed of the stray field based on the L1 magnetization and the stray field based on the L2 magnetization, both of which overlap each other to thereby enhance each other.

As described above, by making the effective perpendicular magnetic anisotropy magnetic field of the perpendicular free layer 122 (L1) smaller than the effective perpendicular magnetic anisotropy magnetic field of the perpendicular free layer 124 (L2), and making the current flow from the perpendicular free layer 122 side to the perpendicular free layer 124 side, it is possible to create the state where the magnetization of the perpendicular free layer 122 and the magnetization of the perpendicular free layer 124 rotate approximately in phase with each other. The magnetization of the perpendicular free layer 122 and the magnetization of the perpendicular free layer 124 oscillate approximately in phase with each other, and thus an elliptically deflected rotating magnetic field formed of a stray field based on the magnetization of the perpendicular free layer 122 and a stray field based on the magnetization of the perpendicular free layer 124, both of which overlap each other to thereby enhance each other, acts on the target bit 151.

As described above, the magnetic recording head according to the first embodiment includes the spin torque oscillator which includes the first perpendicular free layer and second perpendicular free layer, and in which the effective perpendicular magnetic anisotropy magnetic field of the first perpendicular free layer is smaller than the effective perpendicular magnetic anisotropy magnetic field of the second perpendicular free layer, and a current is made to flow through the spin torque oscillator from the first perpendicular free layer side to the second perpendicular free layer side. Thereby, the magnetization of the first perpendicular free layer, and the magnetization of the second perpendicular free layer rotate approximately in phase with each other, and a strong high frequency magnetic field effective for the MAMR can be generated. As a result, it becomes possible to improve the recording density.

Second Embodiment

A second embodiment differs from the first embodiment in the structure of a spin torque oscillator. Specifically, the spin torque oscillator of the first embodiment includes two perpendicular free layers, and the spin torque oscillator of the second embodiment includes three perpendicular free layers. In the second embodiment, descriptions of parts identical to the first embodiment are appropriately omitted.

Figure 7:
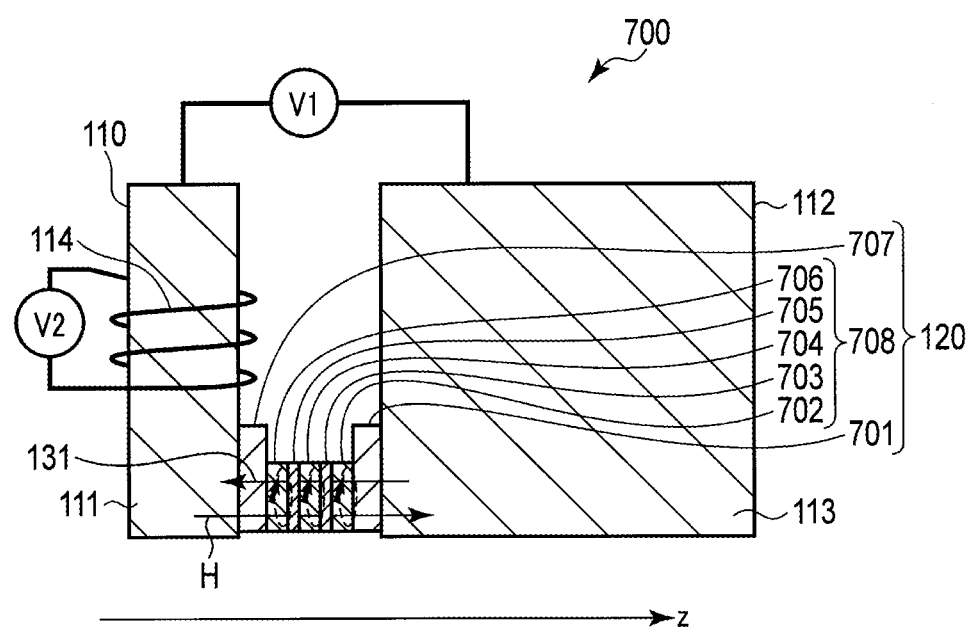
FIG. 7 is a cross-sectional view schematically showing a magnetic recording head according to a second embodiment.

FIG. 7 schematically shows a magnetic recording head 700 according to the second embodiment. As shown in FIG. 7, the magnetic recording head 700 includes a main magnetic pole 110, auxiliary magnetic pole 112 which forms a magnetic circuit together with the main magnetic pole 110, exciting coil 114 winding around the main magnetic pole 110, and spin torque oscillator 120 provided between the main magnetic pole 110 and auxiliary magnetic pole 112.

The spin torque oscillator 120 of this embodiment includes a magnetic multilayer film 708, and a pair of electrode layers 701 and 707 provided to apply a current 131 to the magnetic multilayer 708. The magnetic multilayer 708 includes a perpendicular free layer (first perpendicular free layer) 702, spacer layer (first spacer layer) 703, perpendicular free layer (second perpendicular free layer) 704, spacer layer (second spacer layer) 705, and perpendicular free layer (third perpendicular free layer) 706. Each of the perpendicular free layers 702, 704, and 706 includes a magnetic anisotropy axis in a direction perpendicular to the film plane, and rotatable magnetization. An effective perpendicular magnetic anisotropy magnetic field of the perpendicular free layer 702 is smaller than an effective perpendicular magnetic anisotropy magnetic field of the perpendicular free layer 704. Furthermore, the effective perpendicular magnetic anisotropy magnetic field of the perpendicular free layer 704 is smaller than an effective perpendicular magnetic anisotropy magnetic field of the perpendicular free layer 706.

In the spin torque oscillator 120 of the present embodiment, the electrode layer 701, perpendicular free layer 702, spacer layer 703, perpendicular free layer 704, spacer layer 705, perpendicular free layer 706, and electrode layer 707 are arranged in parallel with each other in the order mentioned. Specifically, the electrode layer 701 is provided on the auxiliary magnetic pole 112, the perpendicular free layer 702 is provided on the electrode layer 701, the spacer layer 703 is provided on the perpendicular free layer 702, the perpendicular free layer 704 is provided on the spacer layer 703, the spacer layer 705 is provided on the perpendicular free layer 704, the perpendicular free layer 706 is provided on the spacer layer 705, the electrode layer 707 is provided on the perpendicular free layer 706, and the main magnetic pole 110 is provided on the electrode layer 707.

In the spin torque oscillator 120, the current 131 flows from the perpendicular free layer 702 side to the perpendicular free layer 706 side. By the mutual spin torque effect between the perpendicular free layer 702 and perpendicular free layer 704, and mutual spin torque effect between the perpendicular free layer 704 and perpendicular free layer 706 each resulting from the current 131, magnetization of the perpendicular free layer 702, magnetization of the perpendicular free layer 704, and magnetization of the perpendicular free layer 706 rotate approximately in phase with each other. Thereby, an elliptically deflected elliptic magnetic field formed of a stray field based on the magnetization of the perpendicular free layer 702, a stray field based on the magnetization of the perpendicular free layer 704, and a stray field based on the magnetization of the perpendicular free layer 706, all of which overlap each other to thereby enhance each other, acts on the target bit (not shown in FIG. 7). The rotational direction of these magnetization phenomena changes according to the direction of the magnetic field from the main magnetic pole 110 acting on the spin torque oscillator 120. The rotational direction of the elliptically deflected rotating magnetic field occurring concomitantly with the rotation of magnetization is identical to the precession movement of the magnetization of the target bit, and thus a high frequency magnetic field effective for the MAMR acts on the target bit.

In the magnetic recording head 700 of this embodiment, by appropriately adjusting the film thickness of the electrode layer 707, and the film thickness of each of the spacer layer 705 and spacer layer 703, it is possible to adjust the distance between the main magnetic pole 110 and target bit, and the distance between the high frequency magnetic field generator (perpendicular free layers 702, 704, and 706) of the spin torque oscillator 120 and target bit.

A perpendicular free layer corresponding to each of the perpendicular free layers 702, 704, and 706 can be formed by using a perpendicular anisotropic material such as a CoCr system material, L10 metal, $Co_3Pt$, SmCo, and the like. Examples of the CoCr system material include CoCr, CoCrTa, CoCrPt, CoCrPtTa, CoCrPtB, and the like. Examples of the L10 metal include L10-FePt, L10-CoPt, and the like. Alternatively, the perpendicular free layer can also be formed by using a multilayer film system material such as a Co/Pd multilayer film, Co/Ni multilayer film, Co/Pt multilayer film, and the like. Also, the perpendicular free layer can also be formed by using a CoFe/MgO interface, CoFeB/MgO interface, FeB/MgO interface, and the like in such a manner that interface magnetic anisotropy is utilized to make the magnetization of the perpendicular free layer truly perpendicular magnetization. The perpendicular free layer can also be utilized in combination with the above-mentioned structures. That is, the perpendicular free layer can include at least one of the CoCr system material, Co/Pd multilayer film, Co/Ni multilayer film, Co/Pt multilayer film, L10 alloy, $Co_3Pt$, SmCo, CoFe/MgO interface, CoFeB/MgO interface, and FeB/MgO interface.

At the time of material selection, it is necessary to take the film thickness of the layer into consideration in order to adjust the magnitude of innate perpendicular magnetic anisotropy Ku of the material, magnitude of saturated magnetization Ms, and demagnetization coefficient Nz in such a manner that the conditions in which the effective perpendicular magnetic anisotropy magnetic field of the perpendicular free layer 702 is smaller than the effective perpendicular magnetic anisotropy magnetic field of the perpendicular free layer 704, and the effective perpendicular magnetic anisotropy magnetic field of the perpendicular free layer 704 is smaller than the effective perpendicular magnetic anisotropy magnetic field of the perpendicular free layer 706, can be satisfied.

Next, a description will be given of the properties of the perpendicular free layers, i.e., that the magnetization of the perpendicular free layer 702, the magnetization of the perpendicular free layer 704, and the magnetization of the perpendicular free layer 706 rotate approximately in phase with each other. The inventors have carried out a simulation as to the dynamics of magnetization of the perpendicular free layer 702, magnetization of the perpendicular free layer 704, and magnetization of the perpendicular free layer 706 on the basis of the LLGS equation into which mutual spin torque and dipole interaction are introduced. It is assumed that the spin torque oscillator 120 has a circular shape with a diameter D of 50 nm (D=50 nm). The positive direction of the current I is assumed to be the +z direction. The positive direction of the magnetic field H acting on the spin torque oscillator 120 is assumed to be the +z direction. Here, the perpendicular free layer 702, the perpendicular free layer 704, and the perpendicular free layer 706 are labeled as L1, L2, and L3, respectively, magnetization of the perpendicular free layer 702 is referred to as L1 magnetization, magnetization of the perpendicular free layer 704 is referred to as L2 magnetization, and magnetization of the perpendicular free layer 706 is referred to as L3 magnetization.

Parameter settings of the simulation will be described below. Regarding the perpendicular free layer L1, parameter settings have been made as follows; saturated magnetization Ms is 0.7 kemu/cm$^3$, film thickness is 6 nm, perpendicular magnetic anisotropy Ku is 3.0 Merg/cm$^3$, and Gilbert attenuation coefficient α is 0.03. Regarding the perpendicular free layer L2, parameter settings have been made as follows; saturated magnetization Ms is 0.7 kemu/cm$^3$, film thickness is 6 nm, perpendicular magnetic anisotropy Ku is 3.2 Merg/cm$^3$, and Gilbert attenuation coefficient α is 0.03. Regarding the perpendicular free layer L3, parameter settings have been made as follows; saturated magnetization Ms is 0.7 kemu/cm$^3$, film thickness is 6 nm, perpendicular magnetic anisotropy Ku is 3.41 Merg/cm$^3$, and Gilbert attenuation coefficient α is 0.03. Besides, the film thickness of the spacer layer 703 has been set to 4 nm, and the film thickness of the spacer layer 705 has been set to 4 nm. Furthermore, the resistance value of the case where the L1 magnetization and the L2 magnetization are arranged in parallel with each other has been set to 50Ω, and the resistance value of the case where the L2 magnetization and the L3 magnetization are arranged in parallel with each other has been set to 50Ω. Furthermore, the magnetoresistance effect ratio of the sandwich structure of the perpendicular free layer L1/spacer layer 703/perpendicular free layer L2 serving as a magnetoresistance effect film has been set to 20%. Also, the magnetoresistance effect ratio of the sandwich structure of the perpendicular free layer L2/spacer layer 705/perpendicular free layer L3 serving as a magnetoresistance effect film has been set to 20%.

In the above parameter settings, the effective perpendicular magnetic anisotropy magnetic field $H_u^{eff}$ of the perpendicular free layer L1 becomes about 1.80 kOe, the effective perpendicular magnetic anisotropy magnetic field $H_u^{eff}$ of the perpendicular free layer L2 becomes about 2.37 kOe, and the effective perpendicular magnetic anisotropy magnetic field $H_u^{eff}$ of the perpendicular free layer L3 becomes about 2.97 kOe. That is, the effective perpendicular magnetic anisotropy magnetic field of the perpendicular free layer L1 is smaller than the effective perpendicular magnetic anisotropy magnetic field of the perpendicular free layer L2 and, furthermore, the effective perpendicular magnetic anisotropy magnetic field of the perpendicular free layer L2 is smaller than the effective perpendicular magnetic anisotropy magnetic field of the perpendicular free layer L3. Here, in the evaluation of the effective perpendicular magnetic anisotropy magnetic field $H_u^{eff}$, a value Nz~0.76961 of the demagnetization coefficient in which a discoid shape having a diameter D of 50 nm, and film thickness of 6 nm is taken into consideration has been used.

Figure 8A:
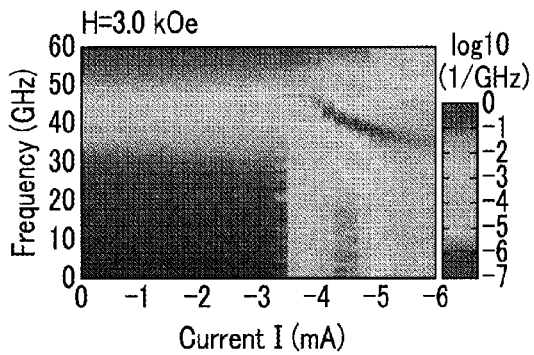
FIG. 8A, FIG. 8B, FIG. 8C, and FIG. 8D are views showing results of a simulation in the case of H=+3 kOe.
Figure 8B:
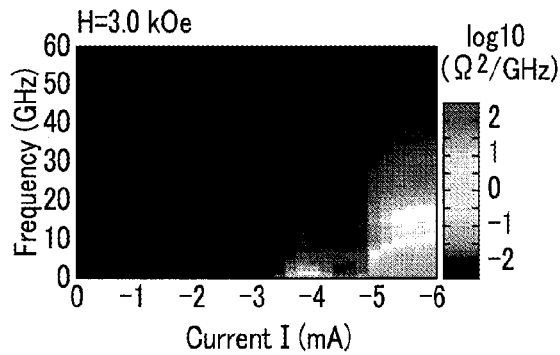
Figure 8C:
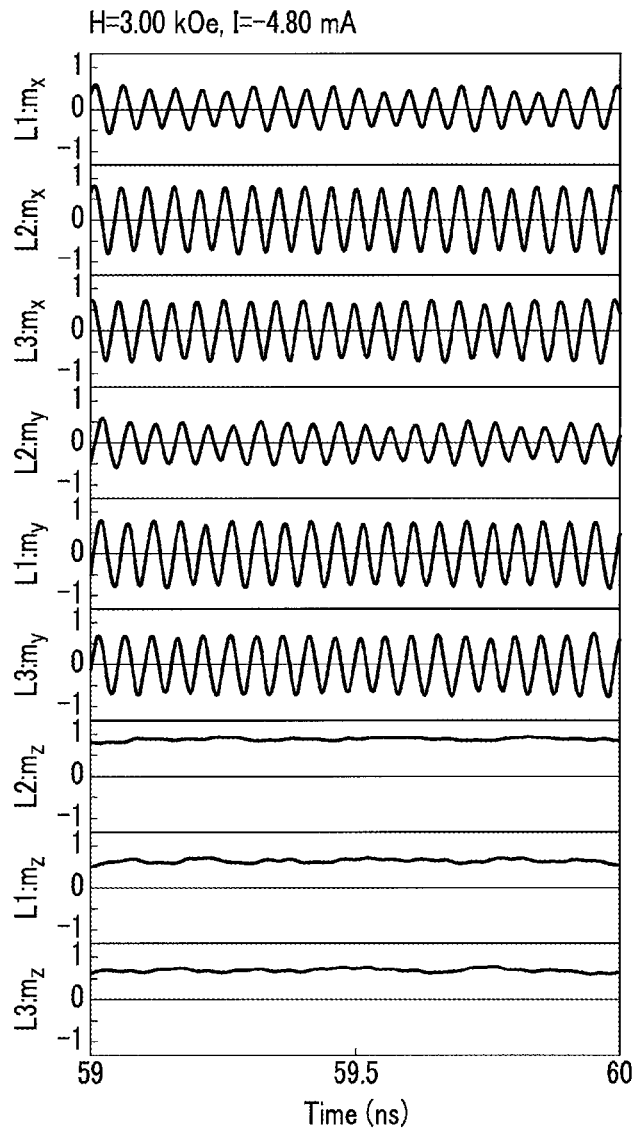
Figure 8D:
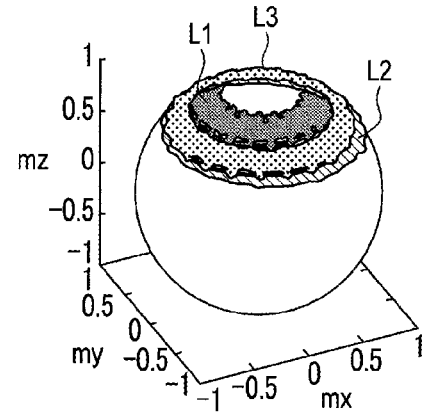

FIGS. 8A to 8D show the dynamics of the L1 magnetization, L2 magnetization, and L3 magnetization in the case where the magnetic field H from the main magnetic pole 110 acting on the spin torque oscillator 120 is +3 kOe (H=+3 kOe). Specifically, FIG. 8A shows the power spectral density of a y component of the L1 magnetization, FIG. 8B shows the power spectral density of the resistance change of the spin torque oscillator 120, FIG. 8C shows part of time-series data of the L1 magnetization, L2 magnetization, and L3 magnetization of the case where I is −4.8 mA (I=−4.8 mA), and FIG. 8D shows the orbits of the L1 magnetization, L2 magnetization, and L3 magnetization of the case where I is −4.8 mA (I=−4.8 mA). The current has been made to flow from the perpendicular free layer L1 side to the perpendicular free layer L3 side (I<0).

As shown in FIGS. 8A to 8D, in the range from −4.2 to −5.0 mA of the current I, the L1 magnetization, the L2 magnetization, and the L3 magnetization synchronously oscillate approximately in phase with each other, and rotate in the direction of a right spiral with respect to the direction of the magnetic field H. When FIG. 8B is referred to, the power spectral density of the resistance change of the spin torque oscillator 120 is very small in that state while reflecting the fact that the oscillation of the L1 magnetization, L2 magnetization, and L3 magnetization is in SYNC. It should be noted that when the current is a positive current (I>0), i.e., when the current is made to flow from the perpendicular free layer L3 side to the perpendicular free layer L1 side, the synchronization of the L1 magnetization, L2 magnetization, and L3 magnetization does not occur, and the L1 magnetization, the L2 magnetization, and the L3 magnetization all exhibit chaotic oscillations.

The L1 magnetization, the L2 magnetization, and the L3 magnetization synchronously oscillate approximately in phase with each other, whereby an elliptically deflected rotating magnetic field formed of a stray field resulting from the magnetization of the perpendicular free layer 702 (L1), a stray field resulting from the magnetization of the perpendicular free layer 704 (L2), and a stray field resulting from the magnetization of the perpendicular free layer 706 (L3), all of which overlap each other to thereby enhance each other, occurs and acts on the target bit. It should be noted that when the magnetic field H is made −3 kOe (H=−3 kOe), an elliptically deflected rotating magnetic field of reversed rotation occurs.

As described above, the effective perpendicular magnetic anisotropy magnetic field of the perpendicular free layer 702 is made smaller than the effective perpendicular magnetic anisotropy magnetic field of the perpendicular free layer 704, the effective perpendicular magnetic anisotropy magnetic field of the perpendicular free layer 704 is made smaller than the effective perpendicular magnetic anisotropy magnetic field of the perpendicular free layer 706, and the current is made to flow from the perpendicular free layer 702 side to the perpendicular free layer 706 side, whereby it is possible to create a state where the magnetization of the perpendicular free layer 702, the magnetization of the perpendicular free layer 704, and the magnetization of the perpendicular free layer 706 rotate approximately in phase with each other. The magnetization of the perpendicular free layer 702, the magnetization of the perpendicular free layer 704, and the magnetization of the perpendicular free layer 706 oscillate approximately in phase with each other, and thus an elliptically deflected rotating magnetic field formed of a stray field resulting from the magnetization of the perpendicular free layer 702, a stray field resulting from the magnetization of the perpendicular free layer 704, and a stray field resulting from the magnetization of the perpendicular free layer 706, all of which overlap each other to thereby enhance each other, acts on the target bit.

As described above, the magnetic recording head according to the second embodiment includes a spin torque oscillator which includes a first perpendicular free layer, second perpendicular free layer, and third perpendicular free layer, and in which an effective perpendicular magnetic anisotropy magnetic field of the first perpendicular free layer is smaller than an effective perpendicular magnetic anisotropy magnetic field of the second perpendicular free layer, and the effective perpendicular magnetic anisotropy magnetic field of the second perpendicular free layer is smaller than an effective perpendicular magnetic anisotropy magnetic field of the third perpendicular free layer, and a current is made to flow through this spin torque oscillator from the first perpendicular free layer side to the third perpendicular free layer side. Thereby, magnetization of the first perpendicular free layer, magnetization of the second perpendicular free layer, and magnetization of the third perpendicular free layer rotate approximately in phase with each other, and it is possible to generate a strong high frequency magnetic field effective for the MAMR. As a result, it becomes possible to improve the recording density.

Third Embodiment

In a third embodiment, a magnetic recording apparatus will be described.

Figure 9:
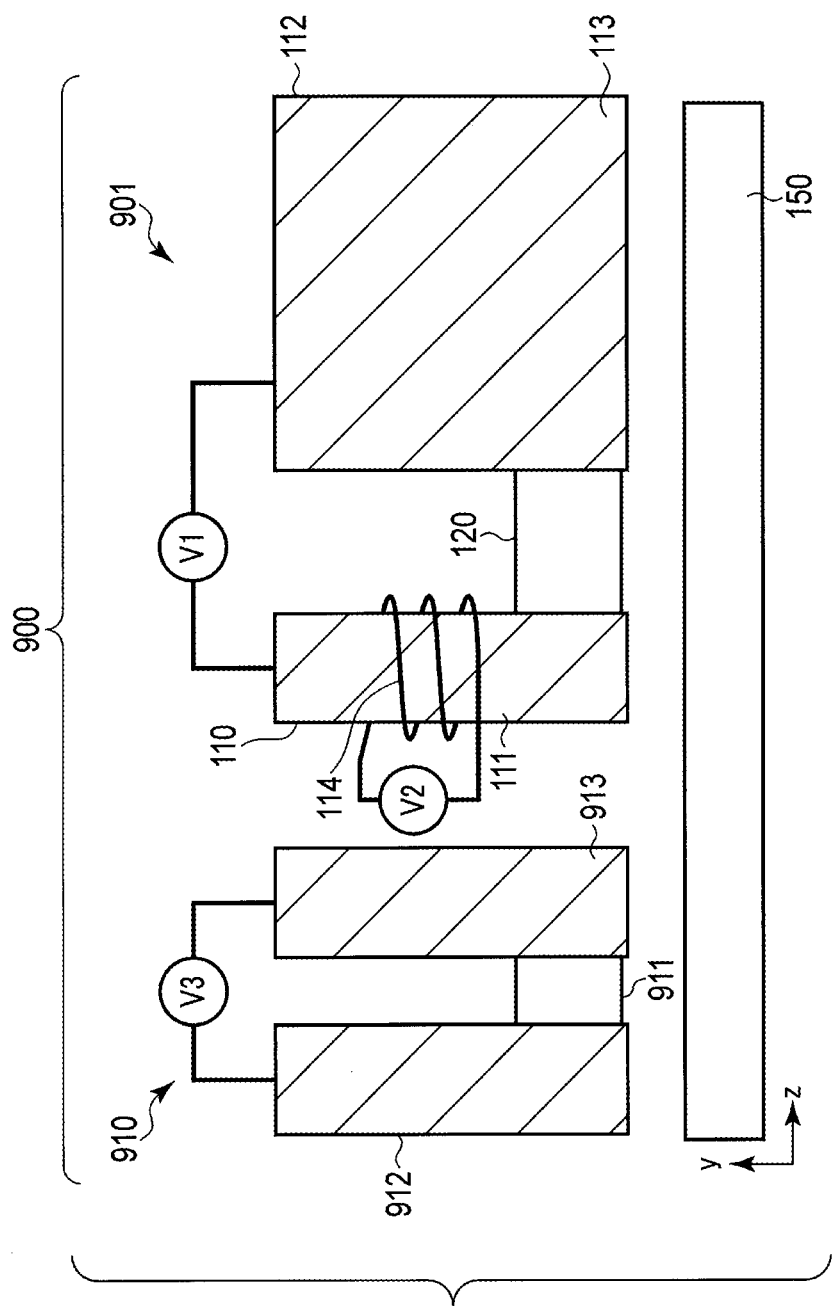
FIG. 9 is a cross-sectional view showing a magnetic recording apparatus according to a third embodiment.

FIG. 9 schematically shows a magnetic recording apparatus according to the third embodiment. As shown in FIG. 9, this magnetic recording apparatus includes a magnetic recording medium 150 and magnetic head 900. The magnetic head 900 includes a magnetic recording head 901 which writes magnetic information on the magnetic recording medium 150, and magnetic reproducing head 910 which reads magnetic information from the magnetic recording medium 150. The magnetic reproducing head 910 is arranged adjacent to the magnetic recording head 901. Although not shown in FIG. 9, the magnetic recording apparatus further includes a driving mechanism which moves the magnetic recording medium 150 and the magnetic head 900 relative to each other, and a signal processor which carry out writing of a signal to the magnetic recording medium, and reading of a signal from the magnetic recording medium 150 by using the magnetic head 900.

The magnetic recording head 901 may be one of or a modification of the magnetic recording heads described in the first and second embodiments. Specifically, a spin torque oscillator 120 shown in FIG. 9 may be a spin torque oscillator including two perpendicular free layers as shown in FIG. 1, or may be a spin torque oscillator including three perpendicular free layers as shown in FIG. 7.

The magnetic reproducing head 910 includes magnetic shielding layers 912 and 913, magnetic reproducing element 911 provided between the magnetic shielding layers 912 and 913, and power supply V3 which supplies a current to the magnetic reproducing element 911. As the magnetic reproducing element 911, a so-called giant magnetoresistance (GMR) film or a tunnel magnetoresistance (TMR) film used in a current HDD can be used. Alternatively, as the magnetic reproducing element 911, a second spin torque oscillator different from the spin torque oscillator 120 in the magnetic recording head 901 may be used. This corresponds to making the magnetic reproducing head 910 a so-called "spin torque oscillator reproducing head". In this case, the signal processor reproduces the magnetic information of the magnetic recording medium 150 by detecting a change in amplitude or phase (frequency) of the high frequency output of the second spin torque oscillator, which is the spin torque oscillator for reproduction. The second spin torque oscillator includes at least one free layer in which magnetization can rotate.

Power supplies V1, V2, and V3 are connected to a controller (not shown), and their operations are controlled by the controller. The controller includes at least one of an analog circuit and digital circuit. As the control of the power supplies V1, V2, and V3 carried out by the controller, for example, control based on a computer program is used.

Figure 10:
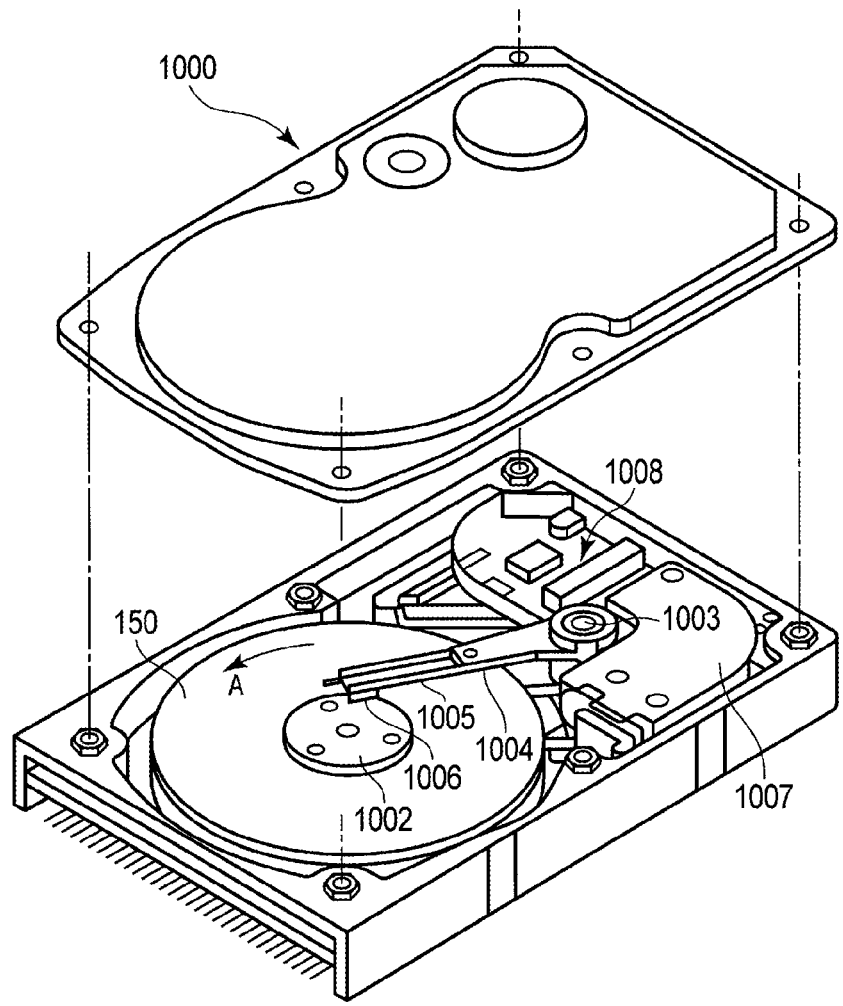
FIG. 10 is a perspective view showing a specific example of the magnetic recording apparatus according to the third embodiment.

FIG. 10 schematically shows an HDD 1000 as a specific example of the magnetic recording apparatus shown in FIG. 9. As shown in FIG. 10, the HDD 1000 includes a magnetic recording medium (magnetic disk) 150. The magnetic recording medium 150 is mounted on a spindle 1002, and is driven in a direction of an arrow A by a spindle motor. On a pivot 1003 provided near the magnetic recording medium 150, an actuator arm 1004 is held. A suspension 1005 is attached to a distal end of the actuator arm 1004. A head slider 1006 is held on the underside of the suspension 1005. A magnetic head 900 shown in FIG. 9 is mounted on the head slider 1006. At a proximal end part of the actuator arm 1004, a voice coil motor 1007 is provided which moves the head slider 1006 to an arbitrary position in the radial direction of the magnetic recording medium 150. Furthermore, a signal processor 1008 is provided which carries out writing of a signal to the magnetic recording medium 150 and reading of a signal from the magnetic recording medium 150 by using the magnetic head 900. Input-output lines (not shown) of the signal processor 1008 are electrically connected to the magnetic head 900.

When the magnetic recording medium 150 is rotated, and the actuator arm 1004 is pivotally rotated by the voice coil motor to load the head slider 1006 on the magnetic recording medium 150, an air bearing surface of the head slider 1006 is held above the surface of the magnetic recording medium 150 with a levitation distance held between both the surfaces. In this state, it is possible to read information from the magnetic recording medium 150 or to write information to the magnetic recording medium 150.

In the magnetic recording head 901, magnetization phenomena of two or three perpendicular free layers rotate in phase with each other, and hence high frequency magnetic fields occurring concomitantly with the rotation of magnetization of these perpendicular free layers do not cancel each other out. Accordingly, it is possible to make the magnetic recording medium 150 a three-dimensional magnetic recording medium.

Figure 11:
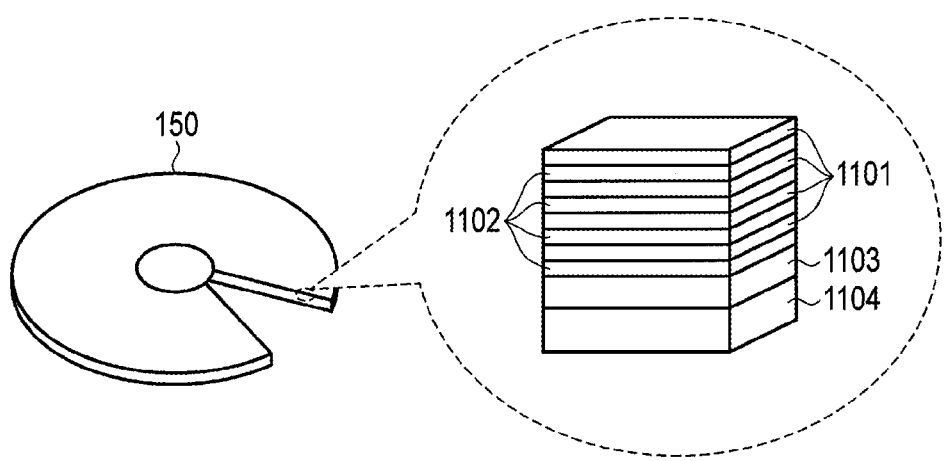
FIG. 11 is a view showing a three-dimensional magnetic recording medium according to an embodiment.

FIG. 11 schematically shows an example in which the magnetic recording medium 150 is a three-dimensional recording medium. The magnetic recording medium 150 shown in FIG. 11 includes a substrate 1104, foundation layer 1103 provided on the substrate 1104, and a plurality of recording interlayers 1102 and a plurality of recording layers 1101 which are provided on the foundation layer 1103. In FIG. 11, although an example in which four recording layers 1101 are provided is shown, the number of recording layers 1101 may be 2, 3, 5 or more. The recording interlayers 1102 are provided so that recording layers 1101 adjacent to each other can be magnetically separated from each other, and are made of a non-magnetic material.

Writing of magnetic information to the plurality of recording layers 1101 is realized by carrying out layer selection by the magnetic recording head 901. Specifically, layer selection is carried out by setting the recording layers 1101 in such a manner that magnetic resonance frequencies of magnetization of the recording layers 1101 are different from each other, and making the frequency of the high frequency magnetic field from the magnetic recording head 901 match with one of the recording layers 1101. Here, assuming a case where four recording layers 1101 are present, the magnetic resonance frequencies of magnetization of the recording layers 1101 are expressed as f1, f2, f3, and f4 in the order from the top of the magnetic recording medium 150. For example, when writing to the recording layer 1101 second from the top is to be carried out, the frequency of the high frequency magnetic field from the magnetic recording head 901 is set to f2. In setting of the frequency of the high frequency magnetic field from the magnetic recording head 901, current dependence of the synchronization frequency of perpendicular free layer magnetization can be utilized. In the example of FIG. 5A, the frequency f changes from 45 to 35 GHz in the range of the current I from −3 to −8 mA. The current dependence has an approximately linear property, and thus an approximate expression of f=51.0+2.0I can be established. Accordingly, by discretely setting values of the current made to flow through the spin torque oscillator 120 by the power supply V1 in the manner of, for example, −4 mA, −5 mA, −6 mA, and −7 mA, it is possible to set the frequencies of the high frequency magnetic field from the magnetic recording head 901 as follows. f1=43 GHz, f2=41 GHz, f3=39 GHz, and f4=37 GHz.

As described above, according to the third embodiment, a magnetic recording apparatus using the magnetic recording head according to any one of the aforementioned embodiments is provided.

According to at least one of the aforementioned embodiments, a magnetic recording head which enables realization of high recording density is provided.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic recording head comprising:
   a main magnetic pole which generates a recording magnetic field; and
   a spin torque oscillator which generates a high frequency magnetic field, the spin torque oscillator comprising a pair of electrode layers and a multilayer film provided between the pair of electrode layers, the multilayer film comprising a first perpendicular free layer in which magnetization is rotatable, a second perpendicular free layer in which magnetization is rotatable, and a first spacer layer provided between the first perpendicular free layer and the second perpendicular free layer, each of the first perpendicular free layer and the second perpendicular free layer including a magnetic anisotropy axis in a direction perpendicular to a film plane of the spin torque oscillator, wherein an effective perpendicular magnetic anisotropy magnetic field of the first perpendicular free layer is smaller than an effective perpendicular magnetic anisotropy magnetic field of the second perpendicular free layer, and a current is applied from the first perpendicular free layer side to the second perpendicular free layer side through the pair of electrode layers.

2. The magnetic recording head according to claim 1, wherein the multilayer film further comprises a third perpendicular free layer which includes a magnetic anisotropy axis in the direction perpendicular to the film plane of the spin torque oscillator and in which magnetization is rotatable, and a second spacer layer provided between the second perpendicular free layer and the third perpendicular free layer, the second perpendicular free layer being provided between the first perpendicular free layer and the third perpendicular free layer, the effective perpendicular magnetic anisotropy magnetic field of the second perpendicular free layer is smaller than an effective perpendicular magnetic anisotropy magnetic field of the third perpendicular free layer, and a current is applied from the first perpendicular free layer side to the third perpendicular free layer side through the pair of electrode layers.

3. The magnetic recording head according to claim 2, wherein
   the third perpendicular free layer comprises at least one of a CoCr system material, a Co/Pd multilayer film, a Co/Ni multilayer film, a Co/Pt multilayer film, an L10 alloy, $Co_3Pt$, SmCo, a CoFe/MgO interface, a CoFeB/MgO interface, and a FeB/MgO interface.

4. The magnetic recording head according to claim 1, wherein
   the first perpendicular free layer comprises at least one of a CoCr system material, a Co/Pd multilayer film, a Co/Ni multilayer film, a Co/Pt multilayer film, an L10 alloy, $Co_3Pt$, SmCo, a CoFe/MgO interface, a CoFeB/MgO interface, and a FeB/MgO interface.

5. The magnetic recording head according to claim 1, wherein
   the second perpendicular free layer comprises at least one of a CoCr system material, a Co/Pd multilayer film, a Co/Ni multilayer film, a Co/Pt multilayer film, an L10 alloy, $Co_3Pt$, SmCo, a CoFe/MgO interface, a CoFeB/MgO interface, and a FeB/MgO interface.

6. A magnetic recording apparatus comprising:
   a magnetic recording medium;
   a magnetic head including a magnetic reproducing head, and the magnetic recording head according to claim 1;
   a driving mechanism which moves the magnetic head and the magnetic recording medium relative to each other; and
   a signal processor which carries out writing of a signal to the magnetic recording medium by using the magnetic recording head, and reading of a signal from the magnetic recording medium by using the magnetic reproducing head.

7. The magnetic recording apparatus according to claim 6, wherein the magnetic reproducing head comprises another spin torque oscillator including at least one free layer in which magnetization is rotatable, and the signal processor reproduces the magnetic information of the magnetic recording medium by detecting a change in amplitude or phase of the high frequency output of the spin torque oscillator of the magnetic reproducing head.

8. The magnetic recording apparatus according to claim 6, wherein the magnetic recording medium is a three-dimensional recording medium including a plurality of recording layers.

* * * * *

UNITED STATES PATENT AND TRADEMARK OFFICE
CERTIFICATE OF CORRECTION

PATENT NO.         : 9,437,218 B2
APPLICATION NO.    : 14/796462
DATED              : September 6, 2016
INVENTOR(S)        : Kudo et al.

Page 1 of 1

It is certified that error appears in the above-identified patent and that said Letters Patent is hereby corrected as shown below:

On the Title Page

Item (72):
"Kiwamu Kudo, Kanagawa (JP); Hirofumi Suto, Tokyo (JP); Tazumi Nagasawa, Kanagawa (JP); Koichi Mizushima, Kanagawa (JP); Rie Sato, Kanagawa (JP)"
Should read:
--Kiwamu Kudo, Kamakura (JP); Hirofumi Suto, Tokyo (JP); Tazumi Nagasawa, Yokohama (JP); Koichi Mizushima, Kamakura (JP); Rie Sato, Yokohama (JP)--.

Signed and Sealed this
Nineteenth Day of December, 2017

Joseph Matal
*Performing the Functions and Duties of the*
*Under Secretary of Commerce for Intellectual Property and*
*Director of the United States Patent and Trademark Office*